UNITED STATES PATENT OFFICE.

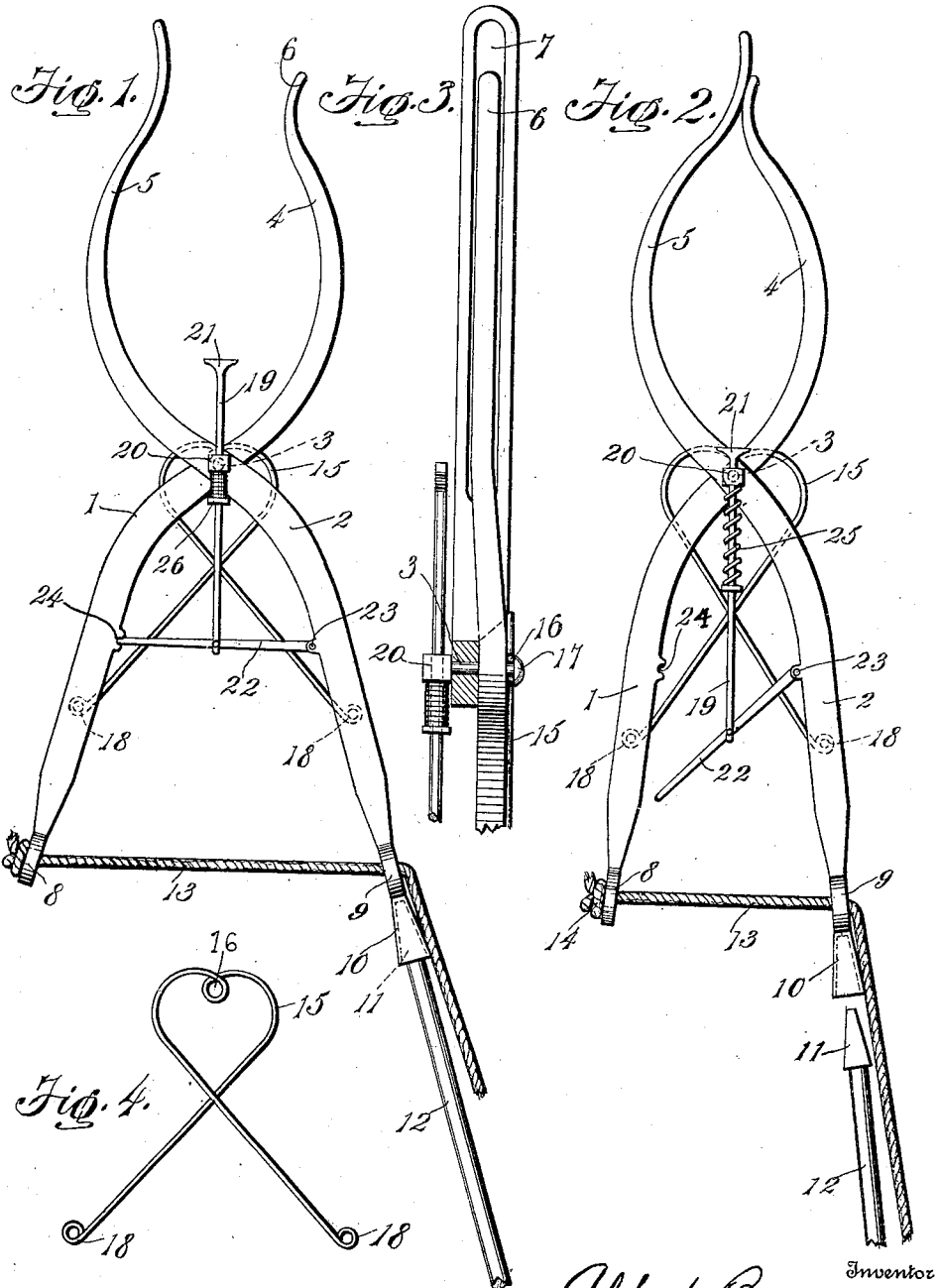

ALBERT BURGER, OF WATKINS, MINNESOTA.

ANIMAL-CATCHER.

No. 918,001.  Specification of Letters Patent.  Patented April 13, 1909.

Application filed December 29, 1908. Serial No. 469,818.

*To all whom it may concern:*

Be it known that I, ALBERT BURGER, a citizen of the United States, residing at Watkins, in the county of Meeker and State of Minnesota, have invented certain new and useful Improvements in Animal-Catchers, of which the following is a specification, reference being had to the accompanying drawings.

This invention relates to improvements in devices for catching hogs and other animals.

The object of the invention is to provide a device of this character which will be simple in construction and more convenient to manipulate than similar devices heretofore produced.

With the above and other objects in view, the invention consists of the novel features of construction and the combination and arrangement of parts hereinafter fully described and claimed, and illustrated in the accompanying drawings, in which—

Figure 1 is a plan view of the device showing its jaws in open position; Fig. 2 is a similar view showing the jaws closed; Fig. 3 is a detail side elevation of the jaw levers showing one of the latter in section on the plane of their pivot; and Fig. 4 is a detail view of the spring.

The invention comprises two jaw members or levers 1, 2 which are crossed intermediate their ends and united by a transverse pivot 3. The outer ends of the levers 1, 2 are curved in opposite directions to provide two opposing jaws 4, 5, the former of which has an oppositely or outwardly turned end 6 adapted to oppose the other similar-shaped jaw 5, which latter is in the form of an elongated loop, as shown more clearly in Fig. 3. The diverging inner or rear ends of the levers 1, 2 are provided with oppositely arranged eyes 8, 9 and said end of the lever 2 is formed beyond its eye 9 with a socket projection 10 adapted to removably receive a pyramidal-shaped head 11 on one end of an operating rod or stick 12. An operating cord 13 passes through the eyes 8, 9 and its outer extremity is knotted or otherwise enlarged, as shown at 14, to prevent it from being pulled through the eye 8. The jaws 4, 5 of the levers are spring actuated to their closed position by means of a spring 15 in the form of a resilient metal rod or wire bent upon itself at its center to form an eye 16 which receives the pivot pin 3 and is retained against the outer face of the lever 1 by one of the heads 17 of said pivot pin, as shown in Fig. 3. The ends of the spring 15 are bent rearwardly in opposite directions and crossed, as seen in Figs. 1 and 2, their extremities being suitably secured, as shown at 18, to the inner ends of the levers 1, 2.

For the purpose of retaining the jaw levers in their open position while being engaged with an animal's leg and automatically releasing them when so engaged, a trip rod 19 is slidably arranged in an aperture in the other head 20 of the pivot pin 3. The other end of the rod 19 has a head 21 which, when the jaw levers are set, projects into the space between the jaws 4, 5 and is adapted to be engaged and actuated inwardly by being pressed against the animal's leg. The inner or rear end of the rod 19 is pivoted intermediate the ends of a latch lever 22 which extends between the inner ends of the levers 1, 2 and has one of its ends pivoted at 23 to the lever 2. The other or free end of the lever 22 is adapted to engage a seat 24 provided at an opposite point upon the lever 1 so that when the parts are in the position shown in Fig. 1, the latch lever 22 will hold the levers in their open position against the tension of the spring 15. To quickly actuate the lever 22 to an inoperative position, after it has been disengaged from the seat 24, a coil spring 25 surrounds the rod 19 and is confined between the pivot head 20 and a stop 26 on said rod.

The operation of the hog or animal catcher is as follows: Assuming the parts to be in set position shown in Fig. 1, the rod 12 is grasped and thrust forward to cause the jaws 4, 5 of the levers to slip over the animal's leg and the head 21 of the push rod 19 to be moved inwardly by engagement with the animal to throw the latch lever 22 off of its seat 24. The instant this is done the spring 25 projects the latch lever 22 to an inoperative position shown in Fig. 2 and the spring 15 actuates the jaw levers to their closed position also shown in said Fig. 2, thereby causing the jaws 4, 5 to tightly grip the animal. The rod 12 may then be removed from the device by disengaging its head 11 from the socket 10 and the animal may be led or controlled by means of the cord 13.

Having thus described the invention what is claimed is:

A device of the character described comprising a pair of crossed jaw levers, a pivot pin passed through said jaw levers at their point of intersection and provided at its ends with heads, one of the latter being apertured, a spring rod or wire bent upon itself at its center to provide an eye arranged upon the pivot pin beneath one of its heads, the ends of the spring being bent in opposite directions and crossed and having their extremities secured to the inner ends of the levers whereby the latter will have their jaws actuated toward each other, a seat upon the inner end of one of the levers, a latch lever pivoted at an opposite point upon the other lever and adapted to have its free end engage said seat to hold the levers extended against the tension of said spring, a trip rod slidable in the aperture in one of the heads of the pivot pin and having its inner end pivoted to the latch lever and its outer end provided with a head to project into the space between the jaws of the lever, a stop upon said rod, a coil spring arranged upon the rod between said stop and the apertured head of the pivot pin, an operating rod detachably connected to one of the levers, and an operating cord between said levers.

In testimony whereof I hereunto affix my signature in the presence of two witnesses.

ALBERT BURGER.

Witnesses:
E. EUDERLE,
EDWIN EHLERS.